(12) United States Patent (10) Patent No.: US 8,747,055 B2
McCune et al. (45) Date of Patent: Jun. 10, 2014

(54) GEARED ARCHITECTURE FOR HIGH SPEED AND SMALL VOLUME FAN DRIVE TURBINE

(71) Applicant: United Technologies Corporation, Hartford, CT (US)

(72) Inventors: Michael E. McCune, Colchester, CT (US); Jason Husband, South Glastonbury, CT (US); Frederick M. Schwarz, Glastonbury, CT (US); Daniel Bernard Kupratis, Wallingford, CT (US); Gabriel L. Suciu, Glastonbury, CT (US); William K. Ackermann, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/974,136

(22) Filed: Aug. 23, 2013

(65) Prior Publication Data

US 2013/0336791 A1    Dec. 19, 2013

Related U.S. Application Data

(63) Continuation of application No. 13/908,177, filed on Jun. 3, 2013, which is a continuation-in-part of application No. 13/623,309, filed on Sep. 20, 2012, which is a continuation-in-part of application No. 13/342,508, filed on Jan. 3, 2012, now Pat. No. 8,297,916.

(60) Provisional application No. 61/494,453, filed on Jun. 8, 2011.

(51) Int. Cl.
*F01D 15/12* (2006.01)

(52) U.S. Cl.
USPC .................................................... 415/122.1

(58) Field of Classification Search
USPC ................ 60/226.1; 415/122.1, 124.1, 124.2
See application file for complete search history.

(56) References Cited

U.S. PATENT DOCUMENTS

| 2,608,821 | A | 9/1952 | Hunsaker |
| 2,748,623 | A | 6/1956 | Hill |
| 3,033,002 | A | 5/1962 | Allan |
| 3,111,005 | A | 11/1963 | Howell et al. |
| 3,185,857 | A | 5/1965 | Johnson |
| 3,526,092 | A | 9/1970 | Steel |
| 3,729,957 | A | 5/1973 | Petrie et al. |
| 3,747,343 | A | 7/1973 | Rosen |
| 3,754,484 | A | 8/1973 | Roberts |

(Continued)

FOREIGN PATENT DOCUMENTS

GB    2419639    9/2009

OTHER PUBLICATIONS

Diagram of prior art V2500 and PW4090 engines.
Jane's Aero-Engines, Issue Seven, Copyright 2000, pp. 510-512.

(Continued)

*Primary Examiner* — Edward Landrum
*Assistant Examiner* — Liam McDowell
(74) *Attorney, Agent, or Firm* — Carlson, Gaskey & Olds, PC (57) ABSTRACT

A gas turbine engine includes a flex mount for a fan drive gear system. A very high speed fan drive turbine drives the fan drive gear system.

20 Claims, 10 Drawing Sheets

(56) References Cited

U.S. PATENT DOCUMENTS

| | | | |
|---|---|---|---|
| 3,861,139 A | 1/1975 | Jones et al. |
| 4,136,286 A | 1/1979 | O'Halloran |
| 4,233,555 A | 11/1980 | Roche |
| 4,405,892 A | 9/1983 | Staerzl et al. |
| 4,463,553 A | 8/1984 | Boudigues |
| 4,660,376 A | 4/1987 | Johnson |
| 4,808,076 A | 2/1989 | Jarmon et al. |
| 4,809,498 A | 3/1989 | Giffin et al. |
| 4,827,712 A | 5/1989 | Coplin |
| 4,879,624 A | 11/1989 | Jones et al. |
| 5,074,109 A | 12/1991 | Mandet et al. |
| 5,081,832 A | 1/1992 | Mowill |
| 5,160,251 A | 11/1992 | Ciokajlo |
| 5,168,208 A | 12/1992 | Schultz et al. |
| 5,182,464 A | 1/1993 | Woodworth et al. |
| 5,252,905 A | 10/1993 | Wills |
| 5,307,622 A | 5/1994 | Ciokajio et al. |
| 5,388,964 A | 2/1995 | Ciokajio et al. |
| 5,390,068 A | 2/1995 | Schultz |
| 5,433,674 A | 7/1995 | Sheridan et al. |
| 5,625,276 A | 4/1997 | Scott et al. |
| 5,694,027 A | 12/1997 | Satake et al. |
| 5,729,059 A | 3/1998 | Kilroy et al. |
| 5,734,255 A | 3/1998 | Thompson et al. |
| 5,740,668 A | 4/1998 | Fujiwara et al. |
| 5,754,033 A | 5/1998 | Thomson et al. |
| 5,806,303 A | 9/1998 | Johnson et al. |
| 5,886,890 A | 3/1999 | Ishida et al. |
| 5,949,153 A | 9/1999 | Tison et al. |
| 6,073,439 A | 6/2000 | Beaven et al. |
| 6,104,171 A | 8/2000 | Dvorsky et al. |
| 6,209,311 B1 | 4/2001 | Itoh et al. |
| 6,223,616 B1 | 5/2001 | Sheridan |
| 6,260,351 B1 | 7/2001 | Delano et al. |
| 6,339,927 B1 | 1/2002 | DiPirtro, Jr. |
| 6,378,308 B1 | 4/2002 | Pfluger |
| 6,555,929 B1 | 4/2003 | Eaton et al. |
| 6,619,030 B1 | 9/2003 | Seda et al. |
| 6,631,310 B1 | 10/2003 | Leslie |
| 6,639,331 B2 | 10/2003 | Schultz |
| 6,647,707 B2 | 11/2003 | Dev |
| 6,653,821 B2 | 11/2003 | Kern et al. |
| 6,657,416 B2 | 12/2003 | Kern et al. |
| 6,663,530 B2 | 12/2003 | Poulin et al. |
| 6,668,629 B1 | 12/2003 | Leslie |
| 6,669,393 B2 | 12/2003 | Schilling |
| 6,708,482 B2 | 3/2004 | Seda |
| 6,732,502 B2 | 5/2004 | Seda et al. |
| 6,735,954 B2 | 5/2004 | MacFarlane et al. |
| 6,763,653 B2 | 7/2004 | Orlando et al. |
| 6,792,759 B2 | 9/2004 | Rollins, III |
| 6,847,297 B2 | 1/2005 | Lavoie et al. |
| 6,855,089 B2 | 2/2005 | Poulin et al. |
| 6,892,115 B2 | 5/2005 | Berkcan et al. |
| 6,895,741 B2 | 5/2005 | Rago et al. |
| 6,909,942 B2 | 6/2005 | Andarawis et al. |
| 6,914,763 B2 | 7/2005 | Reedy |
| 6,966,174 B2 | 11/2005 | Paul |
| 6,985,784 B2 | 1/2006 | Vandevanter et al. |
| 6,999,291 B2 | 2/2006 | Andarawis et al. |
| 7,019,495 B2 | 3/2006 | Patterson |
| 7,043,340 B2 | 5/2006 | Papallo et al. |
| 7,055,306 B2 | 6/2006 | Jones et al. |
| 7,104,918 B2 | 9/2006 | Mitrovic |
| 7,144,349 B2 | 12/2006 | Mitrovic |
| 7,195,446 B2 | 3/2007 | Seda et al. |
| 7,216,475 B2 | 5/2007 | Johnson |
| 7,219,490 B2 | 5/2007 | Dev |
| 7,223,197 B2 | 5/2007 | Poulin et al. |
| 7,269,938 B2 | 9/2007 | Moniz et al. |
| 7,299,621 B2 | 11/2007 | Bart et al. |
| 7,301,738 B2 | 11/2007 | Pearlman et al. |
| 7,334,392 B2 | 2/2008 | Moniz et al. |
| 7,338,259 B2 | 3/2008 | Shah et al. |
| 7,406,830 B2 | 8/2008 | Valentian et al. |
| 7,409,819 B2 | 8/2008 | Henry |
| 7,451,592 B2 * | 11/2008 | Taylor et al. ..................... 60/268 |
| 7,513,103 B2 | 4/2009 | Orlando et al. |
| 7,557,544 B2 | 7/2009 | Heinz et al. |
| 7,591,754 B2 | 9/2009 | Duong et al. |
| 7,594,404 B2 | 9/2009 | Somanath et al. |
| 7,600,370 B2 | 10/2009 | Dawson |
| 7,610,763 B2 | 11/2009 | Somanath et al. |
| 7,632,064 B2 | 12/2009 | Somanath et al. |
| 7,656,060 B2 | 2/2010 | Algrain |
| 7,665,293 B2 | 2/2010 | Wilson et al. |
| 7,685,808 B2 | 3/2010 | Orlando et al. |
| 7,694,505 B2 | 4/2010 | Schilling |
| 7,704,178 B2 | 4/2010 | Sheridan et al. |
| 7,716,914 B2 | 5/2010 | Schilling |
| 7,721,549 B2 | 5/2010 | Baran |
| 7,762,086 B2 | 7/2010 | Schwark |
| 7,765,786 B2 | 8/2010 | Klingels et al. |
| 7,797,946 B2 | 9/2010 | Kumar et al. |
| 7,815,417 B2 | 10/2010 | Somanath et al. |
| 7,816,813 B2 | 10/2010 | Yagudayev et al. |
| 7,832,193 B2 | 11/2010 | Orlando et al. |
| 7,841,163 B2 | 11/2010 | Welch et al. |
| 7,841,165 B2 | 11/2010 | Orlando et al. |
| 7,871,247 B2 | 1/2011 | Shah et al. |
| 7,882,693 B2 | 2/2011 | Schilling |
| 7,926,260 B2 | 4/2011 | Sheridan et al. |
| 7,959,532 B2 | 6/2011 | Suciu et al. |
| 8,015,798 B2 | 9/2011 | Norris et al. |
| 8,015,828 B2 | 9/2011 | Moniz et al. |
| 8,061,969 B2 | 11/2011 | Durocher et al. |
| 8,075,261 B2 | 12/2011 | Merry et al. |
| 8,091,371 B2 | 1/2012 | Durocher et al. |
| 8,104,265 B2 | 1/2012 | Kupratis |
| 8,106,633 B2 | 1/2012 | Dozier et al. |
| 8,166,748 B2 | 5/2012 | Schilling |
| 8,172,717 B2 | 5/2012 | Lopez et al. |
| 8,191,352 B2 | 6/2012 | Schilling |
| 2003/0235523 A1 | 12/2003 | Lyubovsky et al. |
| 2005/0138914 A1 | 6/2005 | Paul |
| 2006/0029894 A1 | 2/2006 | Zinn et al. |
| 2006/0130456 A1 | 6/2006 | Suciu et al. |
| 2006/0177302 A1 | 8/2006 | Barry |
| 2006/0179818 A1 | 8/2006 | Merchant |
| 2006/0244327 A1 | 11/2006 | Kundel |
| 2007/0125066 A1 | 6/2007 | Orlando et al. |
| 2007/0262661 A1 | 11/2007 | Ai |
| 2008/0056888 A1 | 3/2008 | Somanath et al. |
| 2008/0098713 A1 | 5/2008 | Orlando et al. |
| 2008/0098718 A1 | 5/2008 | Henry et al. |
| 2008/0148881 A1 | 6/2008 | Moniz et al. |
| 2008/0149445 A1 | 6/2008 | Kern et al. |
| 2008/0184694 A1 | 8/2008 | Guimbard et al. |
| 2008/0276621 A1 | 11/2008 | Somanath et al. |
| 2008/0304974 A1 | 12/2008 | Marshall et al. |
| 2009/0053058 A1 | 2/2009 | Kohlenberg et al. |
| 2009/0056306 A1 | 3/2009 | Suciu et al. |
| 2009/0097967 A1 | 4/2009 | Smith et al. |
| 2009/0229242 A1 | 9/2009 | Schwark |
| 2009/0293445 A1 | 12/2009 | Ress, Jr. |
| 2009/0317229 A1 | 12/2009 | Suciu et al. |
| 2009/0320488 A1 | 12/2009 | Gilson et al. |
| 2010/0005810 A1 | 1/2010 | Jarrell et al. |
| 2010/0007207 A1 | 1/2010 | Peuser |
| 2010/0080700 A1 | 4/2010 | Venter |
| 2010/0105516 A1 | 4/2010 | Sheridan et al. |
| 2010/0126141 A1 | 5/2010 | Schilling |
| 2010/0132376 A1 | 6/2010 | Durocher et al. |
| 2010/0132377 A1 | 6/2010 | Durocher et al. |
| 2010/0154384 A1 | 6/2010 | Schilling |
| 2010/0219779 A1 | 9/2010 | Bradbrook |
| 2010/0301617 A1 | 12/2010 | Lundbladh |
| 2010/0326050 A1 | 12/2010 | Schilling et al. |
| 2011/0056208 A1 | 3/2011 | Norris et al. |
| 2011/0106510 A1 | 5/2011 | Poon |
| 2011/0116510 A1 | 5/2011 | Breslin et al. |
| 2011/0149624 A1 | 6/2011 | Yamanaka |
| 2012/0007431 A1 | 1/2012 | Jang et al. |
| 2012/0017603 A1 | 1/2012 | Bart et al. |

(56) References Cited

U.S. PATENT DOCUMENTS

| | | |
|---|---|---|
| 2013/0011547 A1 | 1/2013 | Girard et al. |
| 2013/0115476 A1 | 5/2013 | Castle et al. |
| 2013/0192196 A1* | 8/2013 | Suciu et al. .................. 60/226.1 |
| 2013/0259653 A1* | 10/2013 | Schwarz et al. ........... 415/122.1 |

OTHER PUBLICATIONS

Kandebo, Stanley, "GearedTurbofan Engine Design Targets Cost, Complexity," 1998, Aviation Week & Space Technology, vol. 148, Issue 8, start p. 32.

Mattingly, et al., Aircraft Engine Design, 2002, American Institute of Aeronautics and Astronautics, 2nd Edition, p. 292.

Article—"Gears Put a New Spin on Turbofan Performance," printed from Machine Design.com website.

Article—"Gas Power Cycle—Jet Propulsion Technology, a Case Study," from MachineDesign.com website.

Sessions, Ron, "Turbo Hydra-Matic 350 handbook", 1985, The Berkley Publishing Group, pp. 24-25.

Baskharone, Erian, "Principles of Turbomachinery in Air-Breathing Engines", 2006, Cambridge University Press, pp. 261-263.

Nagendra, S., "Optimal rapid multidisciplinary response networks: RAPIDDISK", 2005, Stuct Multidisk Optim 29, 213-231.

Guha, Optimum Fan Pressure Ratio for Bypass Engines with Separate or Mixed Exhaust Streams, 2001, Journal of Propulsion and Power, vol. 17 No. 5 September-October.

Http://www.gereports.com/ges-breakthrough-genx-debuts-at-the-paris-air-show/ dated Jun. 15, 2009 and viewed Jan. 23, 2012.

http://www.geaviation.com/engines/commercial/genx/2b_fett.html viewed Jan. 28, 2012).

International Search Report and Written Opinion mailed Mar. 13, 2013.

* cited by examiner

GEARED ARCHITECTURE FOR HIGH SPEED AND SMALL VOLUME FAN DRIVE TURBINE

CROSS REFERENCE TO RELATED APPLICATIONS

The present disclosure is a continuation of U.S. patent application Ser. No. 13/908,177, filed Jun. 3, 2013, which is a continuation-in-part of U.S. patent application Ser. No. 13/623,309, filed Sep. 20, 2012, which is a continuation-in-part of U.S. patent application Ser. No. 13/342,508, filed Jan. 3, 2012, which claims priority to U.S. Provisional Patent Application No. 61/494,453, filed Jun. 8, 2011.

BACKGROUND

The present disclosure relates to a gas turbine engine, and more particularly to a flexible support structure for a geared architecture therefor.

Epicyclic gearboxes with planetary or star ger trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the power plant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

Further, with the geared architecture as set forth above, the torque and speed of the input into the gear is quite high.

SUMMARY

In a featured embodiment, a gas turbine engine has a fan shaft driving a fan, a frame supporting the fan shaft, and a plurality of gears to drive the fan shaft. A flexible support at least partially supports the plurality of gears. The flexible support has a lesser stiffness than the frame. A first turbine section provides a drive input into the plurality of gears. A second turbine section is also included. The first turbine section has a first exit area at a first exit point and rotates at a first speed. The second turbine section has a second exit area at a second exit point and rotates at a second speed, which is faster than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5.

In another embodiment according to the previous embodiment, the ratio is above or equal to about 0.8.

In another embodiment according to any of the previous embodiments, the first turbine section has at least three stages.

In another embodiment according to any of the previous embodiments, the first turbine section has up to six stages.

In another embodiment according to any of the previous embodiments, the second turbine section has two or fewer stages.

In another embodiment according to any of the previous embodiments, a pressure ratio across the first turbine section is greater than about 5:1.

In another embodiment according to any of the previous embodiments, a ratio of a thrust provided by the engine, to a volume of a turbine section including both the high pressure turbine and the low pressure turbine is greater than or equal to about 1.5 and less than or equal to about 5.5 lbf/inch$^2$.

In another embodiment according to any of the previous embodiments, the frame includes a frame lateral stiffness and a frame transverse stiffness. The flexible support includes a flexible support transverse stiffness and a flexible support lateral stiffness. The flexible support lateral stiffness is less than the frame lateral stiffness and the flexible support transverse stiffness is less than the frame transverse stiffness.

In another embodiment according to any of the previous embodiments, a flexible coupling connects at least one of the plurality of gears to be driven by the first turbine section.

In another embodiment according to any of the previous embodiments, the flexible coupling has a flexible coupling lateral stiffness and a flexible coupling transverse stiffness. The flexible coupling lateral stiffness is less than the frame lateral stiffness. The flexible coupling transverse stiffness is less than the frame transverse stiffness.

In another embodiment according to any of the previous embodiments, the plurality of gears include a gear mesh that defines a gear mesh lateral stiffness and a gear mesh transverse stiffness. The gear mesh lateral stiffness is greater than the flexible support lateral stiffness. The gear mesh transverse stiffness is greater than the flexible support transverse stiffness.

In another featured embodiment, a gas turbine engine has a fan shaft driving a fan, a frame which supports the fan shaft, and a plurality of gears which drives the fan shaft. A flexible support which at least partially supports the plurality of gears has a lesser stiffness than the frame. A high pressure turbine and a low pressure turbine are included, the low pressure turbine being configured to drive one of the plurality of gears. A ratio of a thrust provided by the engine, to a volume of a turbine section including both the high pressure turbine and the low pressure turbine, is are greater than or equal to about 1.5 and less than or equal to about 5.5 lbf/inch$^2$.

In another embodiment according to the previous embodiment, the ratio is greater than or equal to about 2.0.

In another embodiment according to any of the previous embodiments, the ratio is greater than or equal to about 4.0.

In another embodiment according to any of the previous embodiments, the thrust is sea level take-off, flat-rated static thrust.

In another embodiment according to any of the previous embodiments, the frame includes a frame lateral stiffness and a frame transverse stiffness. The flexible support includes a flexible support transverse stiffness and a flexible support lateral stiffness. The flexible support lateral stiffness is less than the frame lateral stiffness and the flexible support transverse stiffness is less than the frame transverse stiffness.

In another embodiment according to any of the previous embodiments, a flexible coupling connects at least one of the plurality of gears to be driven by the first turbine section.

In another embodiment according to any of the previous embodiments, the flexible coupling has a flexible coupling lateral stiffness and a flexible coupling transverse stiffness. The flexible coupling lateral stiffness is less than the frame lateral stiffness, and the flexible coupling transverse stiffness is less than the frame transverse stiffness.

In another embodiment according to any of the previous embodiments, the plurality of gears include a gear mesh that defines a gear mesh lateral stiffness and a gear mesh transverse stiffness. The gear mesh lateral stiffness is greater than the flexible support lateral stiffness. The gear mesh transverse stiffness is greater than the flexible support transverse stiffness.

In another featured embodiment, a gas turbine engine has a fan shaft and a frame which supports the fan shaft. The frame defines at least one of a frame lateral stiffness and a frame transverse stiffness. A gear system drives the fan shaft. A flexible support at least partially supports the gear system. The flexible support defines at least one of a flexible support lateral stiffness with respect to the frame lateral stiffness and a flexible support transverse stiffness with respect to the frame transverse stiffness. An input coupling to the gear system defines at least one of an input coupling lateral stiffness with respect to the frame lateral stiffness and an input coupling transverse stiffness with respect to the frame transverse stiffness.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

Figure 1A:
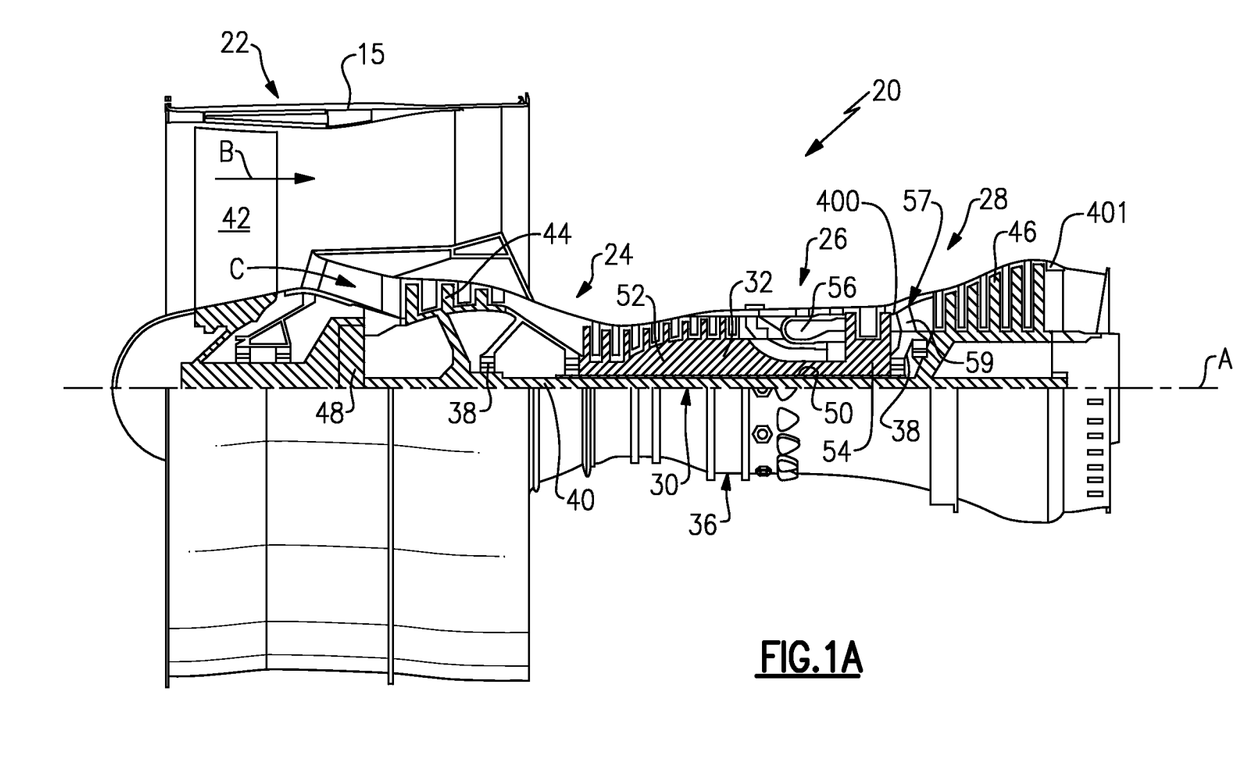
FIG. 1A is a schematic cross-section of a gas turbine engine.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,°R)/(518.7°R)]^{0.5}$. The "Low corrected fan tip speed" as disclosed herein according to one non-limiting embodiment is less than about 1150 ft/second.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion of the airflow passing therethrough.

The amount of thrust that can be produced by a particular turbine section compared to how compact the turbine section is, is referred to as the power density, or the force density, of the turbine section, and is derived by the flat-rated Sea Level Take-Off (SLTO) thrust divided by the volume of the entire turbine section. The example volume is determined from an inlet of the high pressure turbine 54 to an exit of the low pressure turbine 46. In order to increase the power density of the turbine section 28, each of the low pressure and high pressure turbines 46, 54 is made more compact. That is, the high pressure turbine 54 and the low pressure turbine 46 are made with a shorter axial length, and the spacing between each of the turbines 46, 54 is decreased, thereby decreasing the volume of the turbine section 28.

The power density in the disclosed gas turbine engine 20 including the gear driven fan section 22 is greater than those provided in prior art gas turbine engine including a gear driven fan. Eight disclosed exemplary engines, which incorporate turbine sections and fan sections driven through a reduction gear system and architectures as set forth in this application, are described in Table I as follows:

TABLE 1

| Engine | Thrust SLTO (lbf) | Turbine section volume from the Inlet | Thrust/turbine section volume (lbf/in³) |
|---|---|---|---|
| 1 | 17,000 | 3,859 | 4.4 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.1 |
| 6 | 96,500 | 62,172 | 1.55 |
| 7 | 96,500 | 46,629 | 2.07 |
| 8 | 37,098 | 6,745 | 5.50 |

In some embodiments, the power density is greater than or equal to about 1.5 lbf/in³. In further embodiments, the power density is greater than or equal to about 2.0 lbf/in³. In further embodiments, the power density is greater than or equal to about 3.0 lbf/in³. In further embodiments, the power density is greater than or equal to about 4.0 lbf/in³. In further embodiments, the power density is less than or equal to about 5.5 lbf/in³.

Engines made with the disclosed gear driven fan architecture, and including turbine sections as set forth in this application, provide very high efficiency operation, and increased fuel efficiency.

Figure 1B:
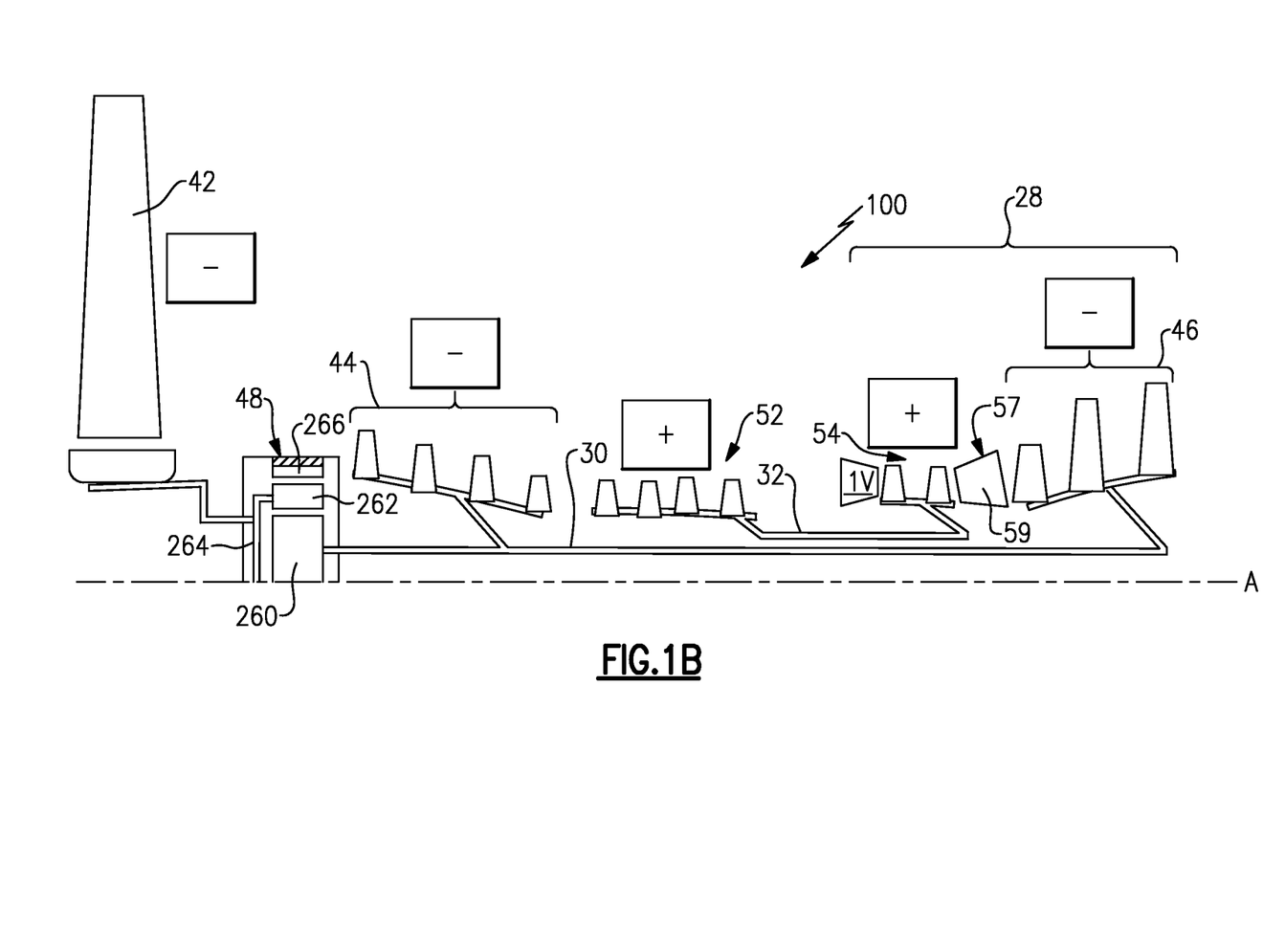
FIG. 1B shows a feature of the FIG. 1A engine.

Referring to FIG. 1B, with continued reference to FIG. 1A, relative rotations between components of example disclosed engine architecture 100 are schematically shown. In the example engine architecture 100, the fan 42 is connected, through the gearbox 48, to the low spool 30 to which the low pressure compressor 44 and the low pressure turbine 46 are connected. The high pressure compressor 52 and the high pressure turbine 54 are connected to a common shaft forming the high spool 32. The high spool 32 rotates opposite the direction of rotation of the fan 42 (illustrated in FIG. 1B as the "+" direction.) The low spool 30 rotates in the same direction as the fan 42 (illustrated in FIG. 1B as the "−" direction.) The high pressure turbine 54 and the low pressure turbine 46, along with the mid-turbine frame 57 together forms the turbine section 28 of the gas turbine engine 20. Other relative rotation directions between the two spools and the fan come within the scope of this disclosure.

One disclosed example speed change device 48 has a gear reduction ratio exceeding 2.3:1, meaning that the low pressure turbine 46 turns at least 2.3 times faster than the fan 42. An example disclosed speed change device is an epicyclical gearbox of a planet type, where the input is to the center "sun" gear 260. Planet gears 262 (only one shown) around the sun gear 260 rotate and are spaced apart by a carrier 264 that rotates in a direction common to the sun gear 260. A ring gear 266, which is non-rotatably fixed to the engine static casing 36 (shown in FIG. 1), contains the entire gear assembly. The fan 42 is attached to and driven by the carrier 264 such that the direction of rotation of the fan 42 is the same as the direction of rotation of the carrier 264 that, in turn, is the same as the direction of rotation of the input sun gear 260. Accordingly, the low pressure compressor 44 and the low pressure turbine 46 counter-rotate relative to the high pressure compressor 52 and the high pressure turbine 54.

Counter rotating the low pressure compressor 44 and the low pressure turbine 46 relative to the high pressure compressor 52 and the high pressure turbine 54 provides certain efficient aerodynamic conditions in the turbine section 28 as the generated high speed exhaust gas flow moves from the high pressure turbine 54 to the low pressure turbine 46. Moreover, the mid-turbine frame 57 contributes to the overall compactness of the turbine section 28. Further, the airfoil 59 of the mid-turbine frame 57 surrounds internal bearing support structures and oil tubes that are cooled. The airfoil 59 also directs flow around the internal bearing support structures and oil tubes for streamlining the high speed exhaust gas flow. Additionally, the airfoil 59 directs flow exiting the high pressure turbine 54 to a proper angle desired to promote increased efficiency of the low pressure turbine 46.

Flow exiting the high pressure turbine 54 has a significant component of tangential swirl. The flow direction exiting the high pressure turbine 54 is set almost ideally for the blades in a first stage of the low pressure turbine 46 for a wide range of engine power settings. Thus, the aerodynamic turning function of the mid turbine frame 57 can be efficiently achieved without dramatic additional alignment of airflow exiting the high pressure turbine 54.

Figure 1C:
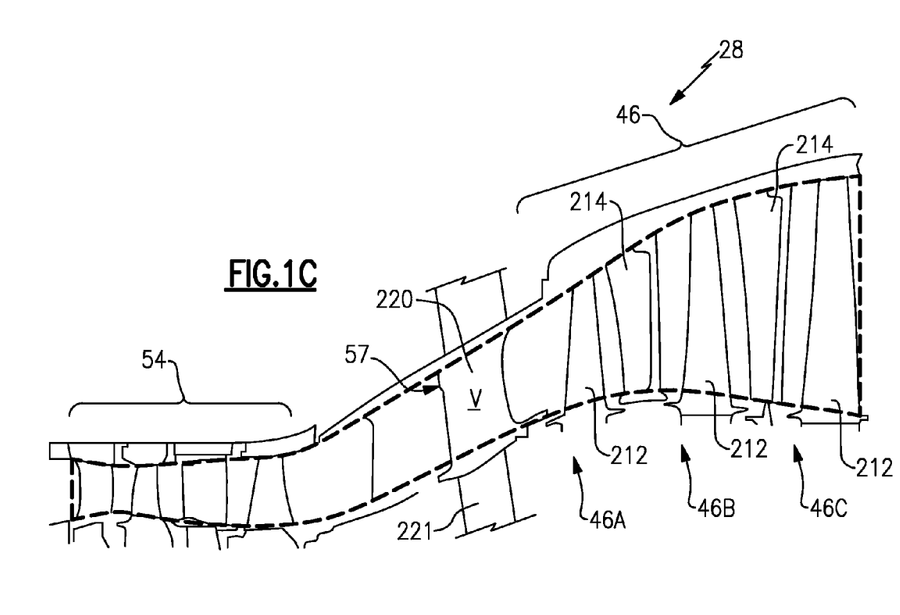
FIG. 1C shows another feature.

Referring to FIG. 1C, the example turbine section 28 volume is schematically shown and includes first, second and third stages 46A, 46B and 46C. Each of the stages 46A, 46B and 46C includes a corresponding plurality of blades 212 and vanes 214. The example turbine section further includes an example air-turning vane 220 between the low and high turbines 54, 46 that has a modest camber to provide a small degree of redirection and achieve a desired flow angle relative to blades 212 of the first stage 46a of the low pressure turbine 46. The disclosed vane 220 could not efficiently perform the desired airflow function if the low and high pressure turbines 54, 46 rotated in a common direction.

The example mid-turbine frame 57 includes multiple air turning vanes 220 in a row that direct air flow exiting the high pressure turbine 54 and ensure that air is flowing in the proper direction and with the proper amount of swirl. Because the disclosed turbine section 28 is more compact than previously utilized turbine sections, air has less distance to travel between exiting the mid-turbine frame 57 and entering the low pressure turbine 46. The smaller axial travel distance results in a decrease in the amount of swirl lost by the airflow during the transition from the mid-turbine frame 57 to the low pressure turbine 46, and allows the vanes 220 of the mid-turbine frame 57 to function as inlet guide vanes of the low pressure turbine 46. The mid-turbine frame 57 also includes a strut 221 providing structural support to both the mid-turbine frame 57 and to the engine housing. In one example, the mid-turbine frame 57 is much more compact by encasing the strut 221 within the vane 220, thereby decreasing the length of the mid-turbine frame 57.

At a given fan tip speed and thrust level provided by a given fan size, the inclusion of the speed change device 48 (shown in FIGS. 1A and 1B) provides a gear reduction ratio, and thus the speed of the low pressure turbine 46 and low pressure compressor 44 components may be increased. More specifically, for a given fan diameter and fan tip speed, increases in gear ratios provide for a faster turning turbine that, in turn, provides for an increasingly compact turbine and increased thrust to volume ratios of the turbine section 28. By increasing the gear reduction ratio, the speed at which the low pressure compressor 44 and the low pressure turbine 46 turn, relative to the speed of the fan 42, is increased.

Increases in rotational speeds of the gas turbine engine 20 components increases overall efficiency, thereby providing for reductions in the diameter and the number of stages of the low pressure compressor 44 and the low pressure turbine 46 that would otherwise be required to maintain desired flow characteristics of the air flowing through the core flow path C. The axial length of each of the low pressure compressor 44 and the low pressure turbine 46 can therefore be further reduced due to efficiencies gained from increased speed provided by an increased gear ratio. Moreover, the reduction in the diameter and the stage count of the turbine section 28 increases the compactness and provides for an overall decrease in required axial length of the example gas turbine engine 20.

In order to further improve the thrust density of the gas turbine engine 20, the example turbine section 28 (including the high pressure turbine 54, the mid-turbine frame 57, and the low pressure turbine 46) is made more compact than traditional turbine engine designs, thereby decreasing the length of the turbine section 28 and the overall length of the gas turbine engine 20.

In order to make the example low pressure turbine 46 compact, make the diameter of the low pressure turbine 46 more compatible with the high pressure turbine 54, and thereby make the air-turning vane 220 of the mid-turbine frame 57 practical, stronger materials in the initial stages of the low pressure turbine 46 may be required. The speeds and centrifugal pull generated at the compact diameter of the low pressure turbine 46 pose a challenge to materials used in prior art low pressure turbines.

Examples of materials and processes within the contemplation of this disclosure for the air-turning vane 220, the low pressure turbine blades 212, and the vanes 214 include materials with directionally solidified grains to provided added strength in a span-wise direction. An example method for creating a vane 220, 214 or turbine blade 212 having directionally solidified grains can be found in U.S. application Ser. No. 13/290,667, and U.S. Pat. Nos. 7,338,259 and 7,871,247, each of which is incorporated by reference. A further, engine embodiment utilizes a cast, hollow blade 212 or vane 214 with cooling air introduced at the leading edge of the blade/vane and a trailing edge discharge of the cooling air. Another embodiment uses an internally cooled blade 212 or vane 214 with film cooling holes. An additional engine embodiment utilizes an aluminum lithium material for construction of a portion of the low pressure turbine 46. The example low pressure turbine 46 may also be constructed utilizing at a powdered metal disc or rotor.

Additionally, one or more rows of turbine blades 212 of the low pressure turbine 46 can be constructed using a single crystal blade material. Single crystal constructions oxidize at higher temperatures as compared to non-single crystal constructions and thus can withstand higher temperature airflow. Higher temperature capability of the turbine blades 212 provide for a more efficient low pressure turbine 46 that may be further reduced in size.

While the illustrated low pressure turbine 46 includes three turbine stages 46a, 46b, and 46c, the low pressure turbine 46 can be modified to include up to six turbine stages. Increasing the number of low pressure turbine stages 46a, 46b, 46c at constant thrust slightly reduces the thrust density of the turbine section 28 but also increases power available to drive the low pressure compressor and the fan section 22.

Further, the example turbine blades may be internally cooled to allow the material to retain a desired strength at higher temperatures and thereby perform as desired in view of the increased centrifugal force generated by the compact configuration while also withstanding the higher temperatures created by adding low pressure compressor 44 stages and increasing fan tip diameter.

Each of the disclosed embodiments enables the low pressure turbine 46 to be more compact and efficient, while also improving radial alignment to the high pressure turbine 54. Improved radial alignment between the low and high pressure turbines 54, 46 increases efficiencies that can offset any increases in manufacturing costs incurred by including the air turning vane 220 of the mid-turbine frame 57.

In light of the foregoing embodiments, the overall size of the turbine section 28 has been greatly reduced, thereby enhancing the engine's power density. Further, as a result of the improvement in power density, the engine's overall propulsive efficiency has been improved.

Figure 1D:
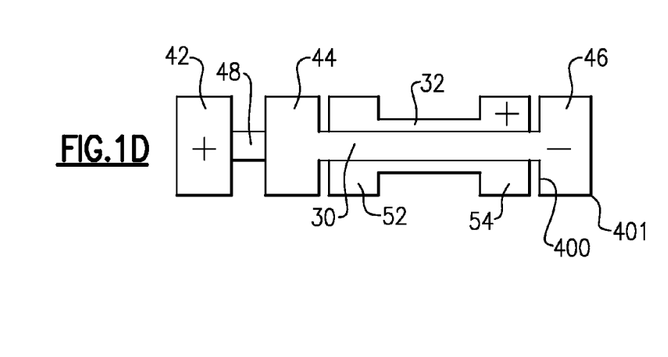
FIG. 1D shows yet another feature.

An exit area 400 is shown, in FIG. 1D and FIG. 1A, at the exit location for the high pressure turbine section 54. An exit area for the low pressure turbine section is defined at exit 401 for the low pressure turbine section. As shown in FIG. 1D, the turbine engine 20 may be counter-rotating. This means that the low pressure turbine section 46 and low pressure compressor section 44 rotate in one direction, while the high pressure spool 32, including high pressure turbine section 54 and high pressure compressor section 52 rotate in an opposed direction. The gear reduction 48, which may be, for example, an epicyclic transmission (e.g., with a sun, ring, and star gears), is selected such that the fan 42 rotates in the same direction as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{lpt}=(A_{lpt} \times V_{lpt}^2) \quad \text{Equation 1}$$

$$PQ_{hpt}=(A_{hpt} \times V_{hpt}^2) \quad \text{Equation 2}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the low pressure turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2)=PQ_{lpt}/PQ_{hpt} \quad \text{Equation 3}$$

In one turbine embodiment made according to the above design, the areas of the low and high pressure turbine sections are 557.9 in² and 90.67 in², respectively. Further, the speeds of the low and high pressure turbine sections are 10179 rpm and 24346 rpm, respectively. Thus, using Equations 1 and 2 above, the performance quantities for the low and high pressure turbine sections are:

$$PQ_{lpt}=(A_{lpt} \times V_{lpt}^2)=(557.9 \text{ in}^2)(10179 \text{ rpm})^2=57805157673.9 \text{ in}^2 \text{ rpm}^2 \quad \text{Equation 1}$$

$$PQ_{hpt}=(A_{hpt} \times V_{hpt}^2)=(90.67 \text{ in}^2)(24346 \text{ rpm})^2=53742622009.72 \text{ in}^2 \text{ rpm}^2 \quad \text{Equation 2}$$

and using Equation 3 above, the ratio for the low pressure turbine section to the high pressure turbine section is:

$$\text{Ratio}=PQ_{lpt}/PQ_{hpt}=57805157673.9 \text{ in}^2 \text{ rpm}^2/53742622009.72 \text{ in}^2 \text{ rpm}^2=1.075$$

In another embodiment, the ratio was about 0.5 and in another embodiment the ratio was about 1.5. With $PQ_{lpt}/PQ_{hpt}$ ratios in the 0.5 to 1.5 range, a very efficient overall gas turbine engine is achieved. More narrowly, $PQ_{lpt}/PQ_{hpt}$ ratios of above or equal to about 0.8 are more efficient. Even more narrowly, $PQ_{lpt}/PQ_{hpt}$ ratios above or equal to 1.0 are even more efficient. As a result of these $PQ_{lpt}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more work in fewer stages. The low pressure compressor section may be made smaller in radius and shorter in length while contributing more toward achieving the overall pressure ratio design target of the engine.

A worker of ordinary skill in the art, being apprised of the disclosure above, would recognize that high torque and high speed will be presented by the low speed spool 30 into the gear architecture 48. Thus, a flexible mount arrangement becomes important.

Figure 2:
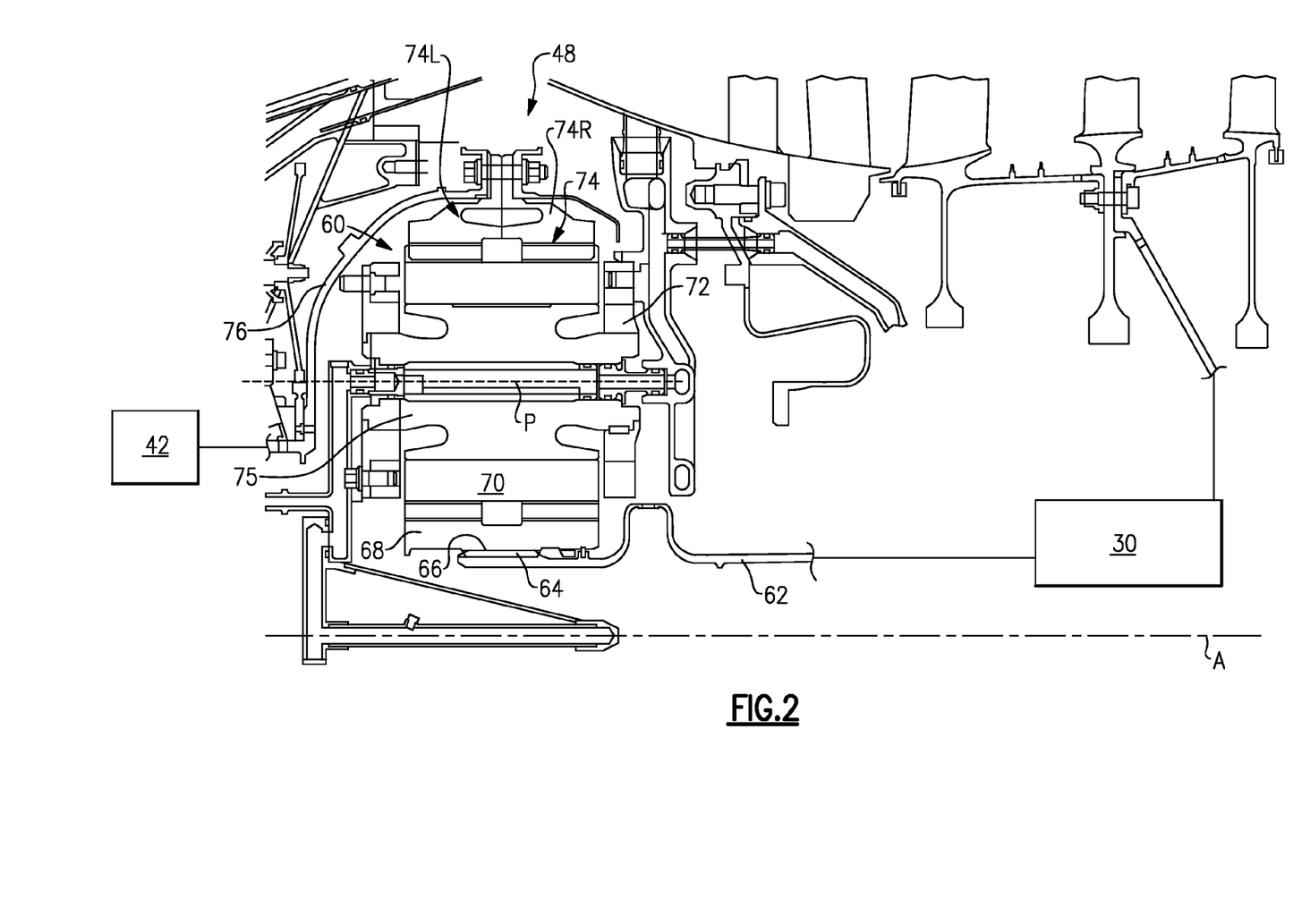
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input coupling 62. A bearing 38C supports spool 30 (see FIG. 3). The input coupling 62 both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P. The gears may be generally as shown schematically in FIG. 1B.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
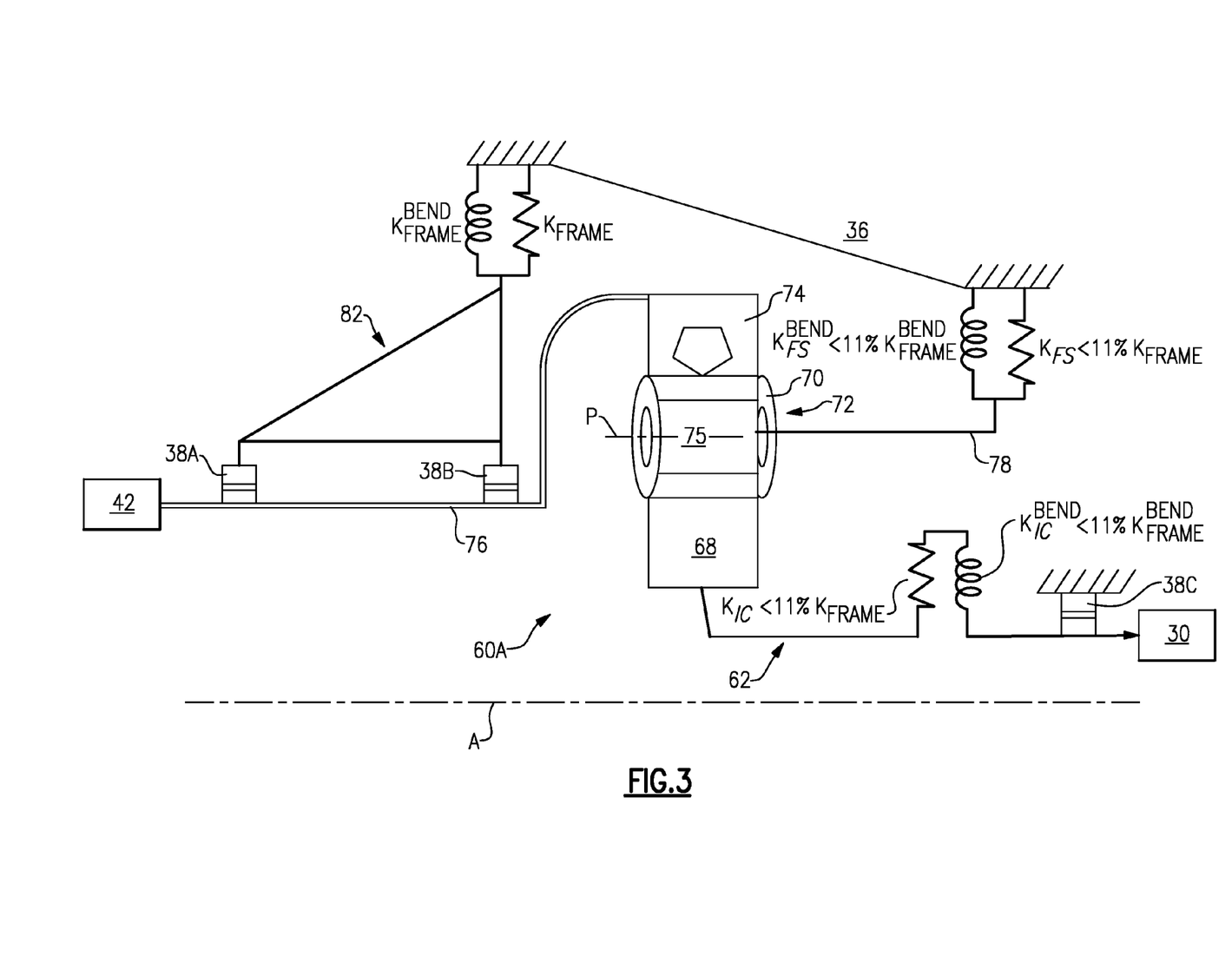
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It is to be understood that the term "lateral" as used herein refers to a perpendicular direction with respect to the axis of rotation A and the term "transverse" refers to a pivotal bending movement with respect to the axis of rotation A so as to absorb deflections which may be otherwise applied to the FDGS 60. The static structure 36 may further include a number 1 and 1.5 bearing support static structure 82 which is commonly referred to as a "K-frame" which supports the number 1 and number 1.5 bearing systems 38A. 38B. Notably, the K-frame bearing support defines a lateral stiffness (represented as Kframe in FIG. 3) and a transverse stiffness (represented as Kframe$^{BEND}$ in FIG. 3) as the referenced factors in this non-limiting embodiment.

In this disclosed non-limiting embodiment, the lateral stiffness (KFS; KIC) of both the flexible support 78 and the input coupling 62 are each less than about 11% of the lateral stiffness (Kframe). That is, the lateral stiffness of the entire FDGS 60 is controlled by this lateral stiffness relationship. Alternatively, or in addition to this relationship, the transverse stiffness of both the flexible support 78 and the input coupling 62 are each less than about 11% of the transverse stiffness (Kframe$^{BEND}$). That is, the transverse stiffness of the entire FDGS 60 is controlled by this transverse stiffness relationship.

Figure 4:
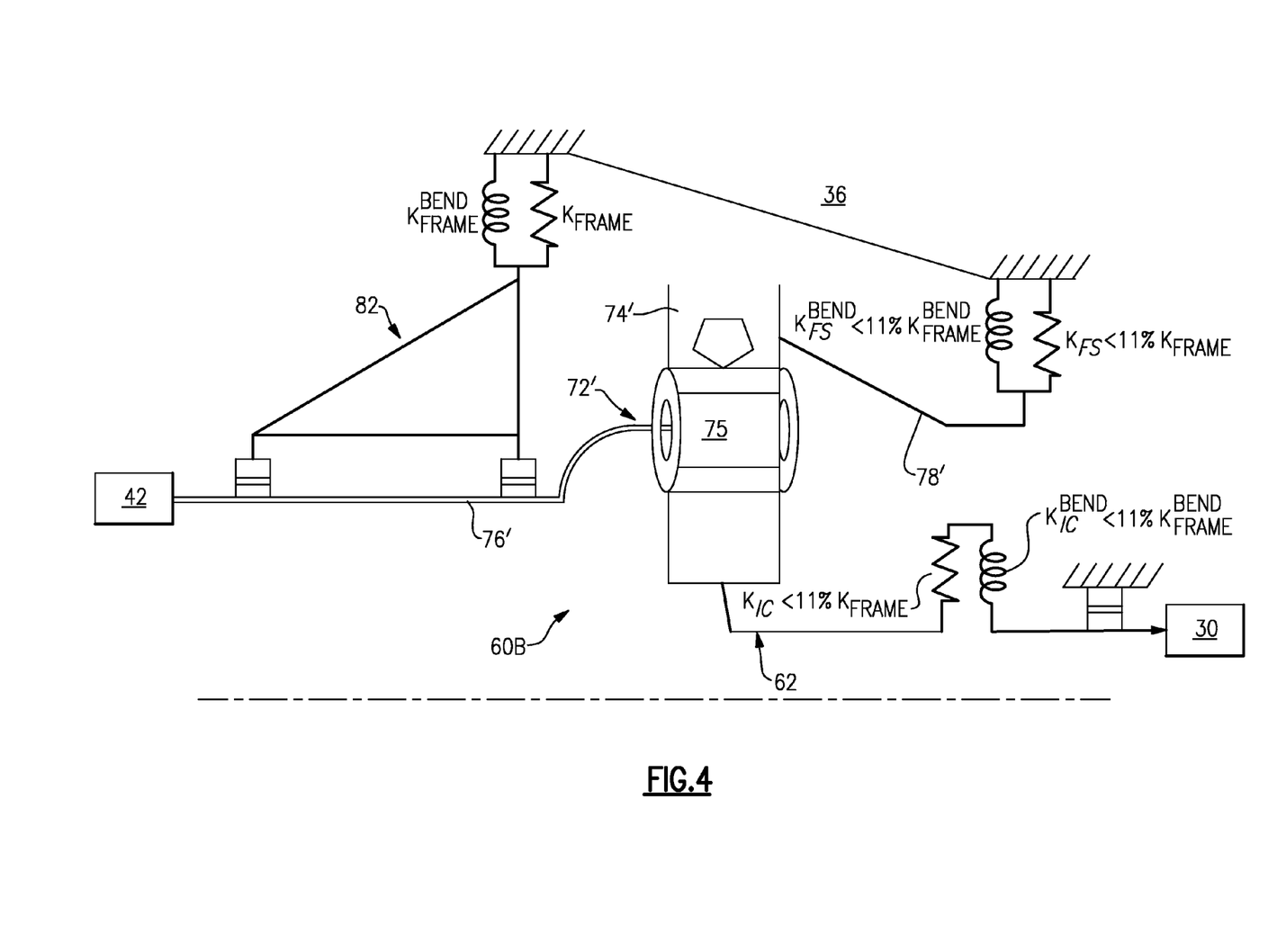
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
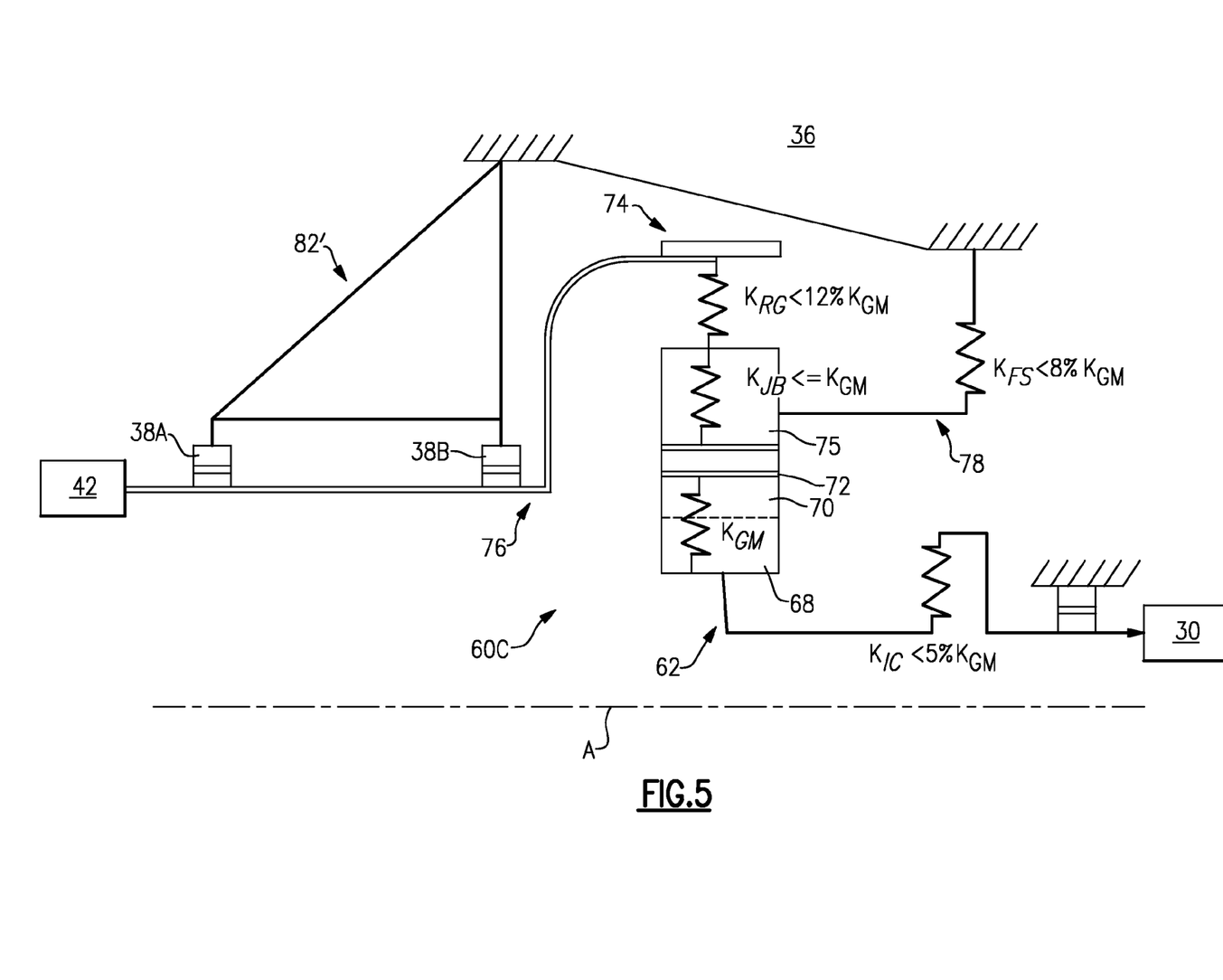
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh.

Figure 6:
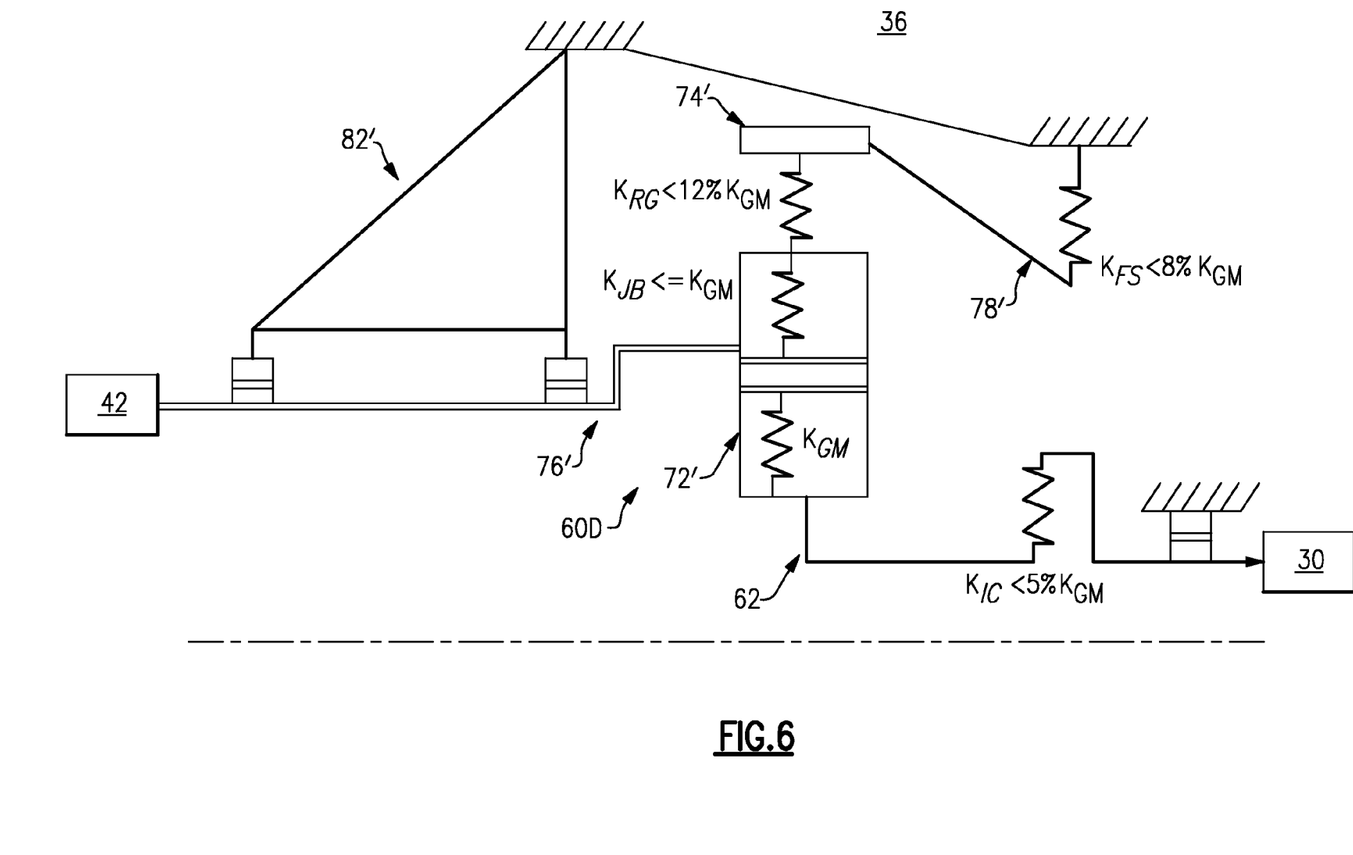
FIG. 6 is a schematic view of a flex mount arrangement for another non-limiting embodiment of a planetary system FDGS.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

Figure 7:
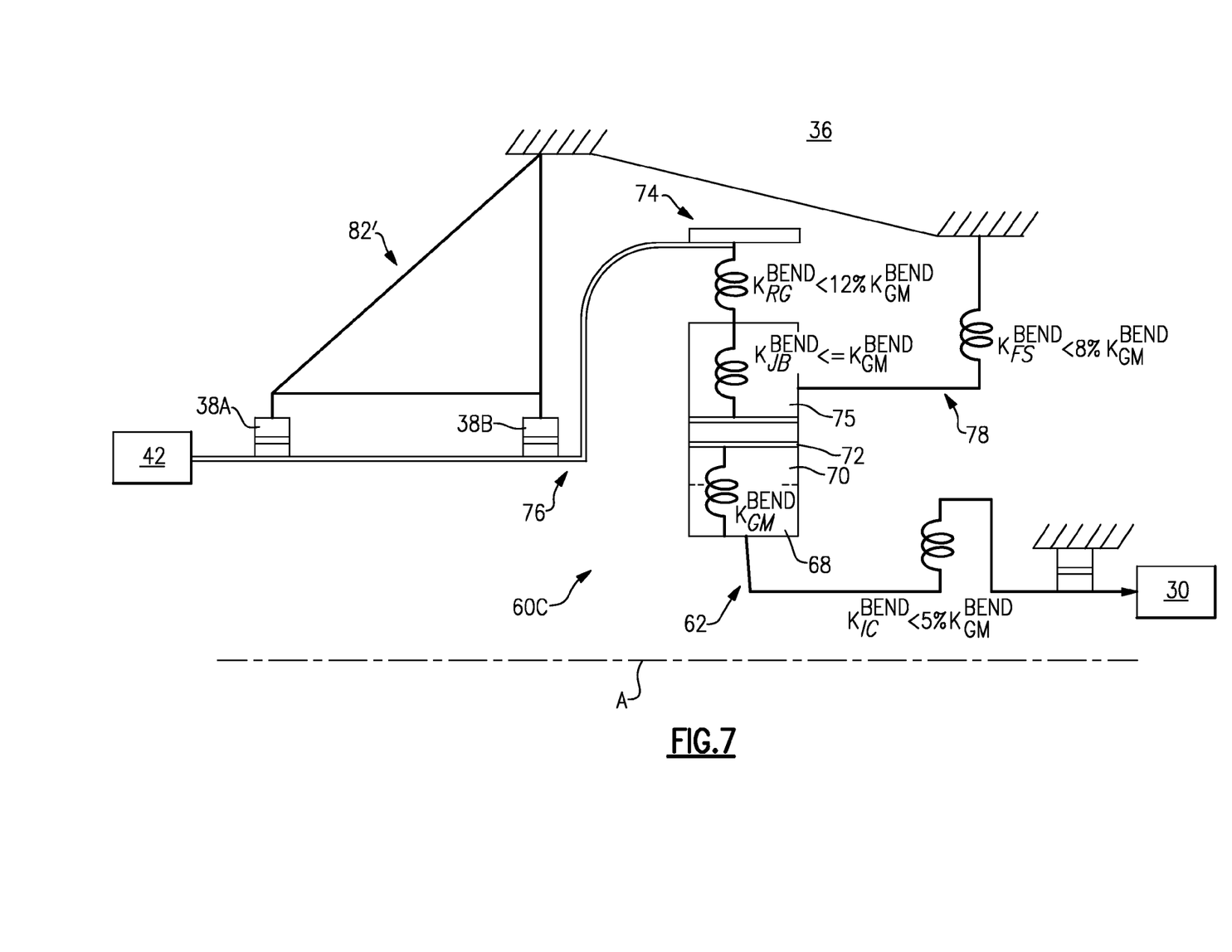
FIG. 7 is a schematic view of a flex mount arrangement for another non-limiting embodiment of a star system FDGS.

FIG. 7 is similar to FIG. 5 but shows the transverse stiffness relationships within the FDGS 60C (for a star system architecture). The transverse stiffness ($KIC^{BEND}$) of the input coupling 62, a transverse stiffness ($KFS^{BEND}$) of the flexible support 78, a transverse stiffness ($KRG^{BEND}$) of the ring gear 74 and a transverse stiffness ($KJB^{BEND}$) of the planet journal bearing 75 are controlled with respect to a transverse stiffness ($KGM^{BEND}$) of the gear mesh within the FDGS 60.

In the disclosed non-limiting embodiment, the stiffness ($KGM^{BEND}$) may be defined by the gear mesh between the sun gear 68 and the multiple planet gears 70. The transverse stiffness ($KGM^{BEND}$) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The transverse stiffness ($KJB^{BEND}$) may be mechanically defined by, for example, the stiffness within the planet journal bearing 75 and the transverse stiffness ($KRG^{BEND}$) of the ring gear 74 may be mechanically defined by, for example, the geometry of the ring gear wings 74L, 74R (FIG. 2).

In the disclosed non-limiting embodiment, the transverse stiffness ($KRG^{BEND}$) of the ring gear 74 is less than about 12% of the transverse stiffness ($KGM^{BEND}$) of the gear mesh; the transverse stiffness ($KFS^{BEND}$) of the flexible support 78 is less than about 8% of the transverse stiffness ($KGM^{BEND}$) of the gear mesh; the transverse stiffness ($KJB^{BEND}$) of the planet journal bearing 75 is less than or equal to the transverse stiffness ($KGM^{BEND}$) of the gear mesh; and the transverse stiffness ($KIC^{BEND}$) of an input coupling 62 is less than about 5% of the transverse stiffness ($KGM^{BEND}$) of the gear mesh.

Figure 8:
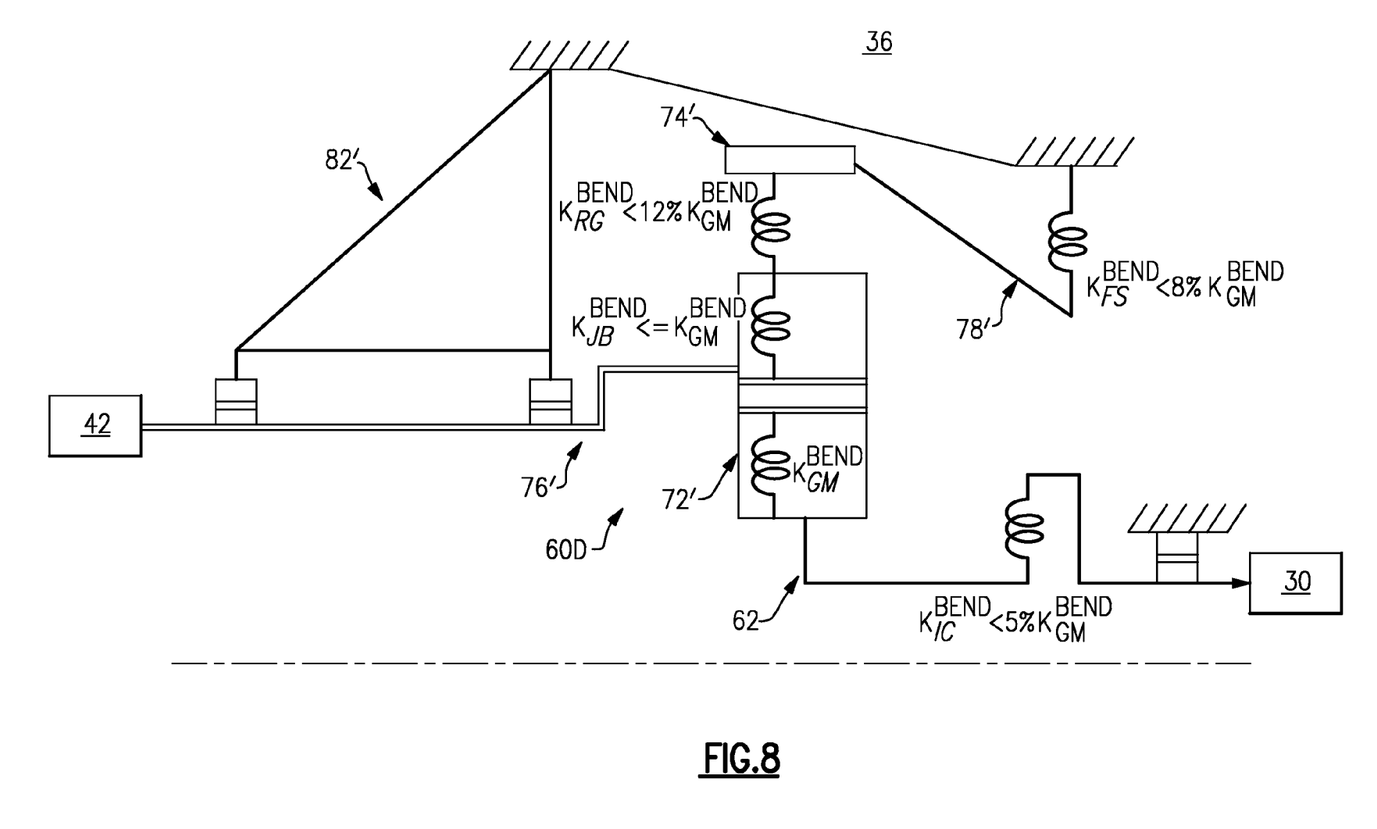
FIG. 8 is a schematic view of a flex mount arrangement for another non-limiting embodiment of a planetary system FDGS.

FIG. 8 is similar to FIG. 6 but shows the transverse stiffness relationship within the FDGS 60D for the planetary gear system architecture.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The combined arrangement of the high power density and fan drive turbine with the high $AN^2$ performance quantity, all incorporated with the flexible mounting structure, provide a very robust and efficient gas turbine engine.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
    a fan shaft driving a fan;
    a frame which supports said fan shaft;
    a plurality of gears to drive said fan shaft;

a flexible support which at least partially supports said plurality of gears, said flexible support having a lesser stiffness than said frame;

a first turbine section providing a drive input into said plurality of gears; and a second turbine section, wherein said first turbine section has a first exit area at a first exit point and rotates at a first speed, wherein said second turbine section has a second exit area at a second exit point and rotates at a second speed, which is faster than the first speed, wherein a first performance quantity is defined as the product of the first speed squared and the first area, wherein a second performance quantity is defined as the product of the second speed squared and the second area, and wherein a ratio of the first performance quantity to the second performance quantity is between about 0.5 and about 1.5.

2. The gas turbine engine as set forth in claim 1, wherein said ratio is above or equal to about 0.8.

3. The gas turbine engine as set forth in claim 1, wherein said first turbine section has at least 3 stages.

4. The gas turbine engine as set forth in claim 1, wherein said first turbine section has up to 6 stages.

5. The gas turbine engine as set forth in claim 1, wherein said second turbine section has 2 or fewer stages.

6. The gas turbine engine as set forth in claim 1, wherein a pressure ratio across the first turbine section is greater than about 5:1.

7. The gas turbine engine as set forth in claim 1, including a ratio of a thrust provided by said engine, to a volume of a turbine section including both said high pressure turbine and said low pressure turbine being greater than or equal to about 1.5 and less than or equal to about 5.5 lbf/inch$^3$.

8. The gas turbine engine as set forth in claim 1, wherein said frame includes a frame lateral stiffness and a frame transverse stiffness, and said flexible support includes a flexible support transverse stiffness and a flexible support lateral stiffness, and said flexible support lateral stiffness being less than said frame lateral stiffness and said flexible support transverse stiffness being less than said frame transverse stiffness.

9. The gas turbine engine as set forth in claim 8, wherein a flexible coupling connects at least one of said plurality of gears to be driven by said first turbine section.

10. The gas turbine engine as set forth in claim 9, wherein said flexible coupling has a flexible coupling lateral stiffness and a flexible coupling transverse stiffness, and said flexible coupling lateral stiffness being less than said frame lateral stiffness, and said flexible coupling transverse stiffness being less than said frame transverse stiffness.

11. The gas turbine engine as set forth in claim 8, wherein said plurality of gears include a gear mesh that defines a gear mesh lateral stiffness and a gear mesh transverse stiffness, said gear mesh lateral stiffness being greater than said flexible support lateral stiffness and said gear mesh transverse stiffness being greater than said flexible support transverse stiffness.

12. A gas turbine engine comprising:
a fan shaft driving a fan;
a frame which supports said fan shaft;
a plurality of gears which drives the fan shaft;
a flexible support which at least partially supports said plurality of gears, said flexible support having a lesser stiffness than said frame;
a high pressure turbine;
a low pressure turbine, said low pressure turbine being configured to drive one of said plurality of gears;
a ratio of a thrust provided by said engine, to a volume of a turbine section including both said high pressure turbine and said low pressure turbine being greater than or equal to about 1.5 and less than or equal to about 5.5 lbf/inch$^3$.

13. The gas turbine engine as set forth in claim 12, wherein said ratio is greater than or equal to about 2.0.

14. The gas turbine engine as set forth in claim 13, wherein said ratio is greater than or equal to about 4.0.

15. The gas turbine engine as set forth in claim 12, wherein said thrust is sea level take-off, flat-rated static thrust.

16. The gas turbine engine as set forth in claim 12, wherein said frame includes a frame lateral stiffness and a frame transverse stiffness, and said flexible support includes a flexible support transverse stiffness and a flexible support lateral stiffness, and said flexible support lateral stiffness being less than said frame lateral stiffness and said flexible support transverse stiffness being less than said frame transverse stiffness.

17. The gas turbine engine as set forth in claim 16, wherein a flexible coupling connects at least one of said plurality of gears to be driven by said first turbine section.

18. The gas turbine engine as set forth in claim 17, wherein said flexible coupling has a flexible coupling lateral stiffness and a flexible coupling transverse stiffness, and said flexible coupling lateral stiffness being less than said frame lateral stiffness, and said flexible coupling transverse stiffness being less than said frame transverse stiffness.

19. The gas turbine engine as set forth in claim 16, wherein said plurality of gears include a gear mesh that defines a gear mesh lateral stiffness and a gear mesh transverse stiffness, said gear mesh lateral stiffness being greater than said flexible support lateral stiffness and said gear mesh transverse stiffness being greater than said flexible support transverse stiffness.

20. A gas turbine engine comprising:
a fan shaft;
a frame which supports said fan shaft, said frame defines at least one of a frame lateral stiffness and a frame transverse stiffness;
a gear system which drives said fan shaft;
a flexible support which at least partially supports said gear system, said flexible support defines at least one of a flexible support lateral stiffness with respect to said frame lateral stiffness and a flexible support transverse stiffness with respect to said frame transverse stiffness; and
an input coupling to said gear system, said input coupling defines at least one of an input coupling lateral stiffness with respect to said frame lateral stiffness and an input coupling transverse stiffness with respect to said frame transverse stiffness.

* * * * *